US012803950B2

(12) United States Patent
Jaiswal et al.

(10) Patent No.: US 12,803,950 B2
(45) Date of Patent: Nov. 17, 2026

(54) CLIENT IP PERSISTENCE FOR TRAFFIC EGRESSING FROM A DISTRIBUTED SERVICE ACCESS SERVICE EDGE (SASE) INFRASTRUCTURE

(71) Applicant: Palo Alto Networks, Inc., Santa Clara, CA (US)

(72) Inventors: Suraj Kumar Jaiswal, Santa Clara, CA (US); Pankaj Bhagra, Fremont, CA (US); Hao Long, Campbell, CA (US); Adithyaraghav Thirumalai Ananthampillai, San Jose, CA (US); Siva Kollipara, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/961,092

(22) Filed: Nov. 26, 2024

(65) Prior Publication Data

US 2026/0149688 A1 May 28, 2026

(51) Int. Cl.

*H04L 61/2514* (2022.01)
*H04L 9/40* (2022.01)
*H04L 67/10* (2022.01)

(52) U.S. Cl.

CPC .......... *H04L 61/2514* (2013.01); *H04L 63/20* (2013.01); *H04L 67/10* (2013.01)

(58) Field of Classification Search

CPC ...... H04L 61/2514; H04L 63/20; H04L 67/10
See application file for complete search history.

(56) References Cited

U.S. PATENT DOCUMENTS

| | | | | |
|---|---|---|---|---|
| 10,666,460 | B2 | 5/2020 | Cidon | |
| 10,999,100 | B2 | 5/2021 | Cidon | |
| 11,075,840 | B1 | 7/2021 | Qian | |
| 11,265,289 | B2 | 3/2022 | Moreno | |
| 2019/0103993 | A1 | 4/2019 | Cidon | |
| 2020/0259792 | A1 | 8/2020 | Devarajan | |
| 2022/0103597 | A1* | 3/2022 | Gobena | H04L 63/105 |
| 2022/0174037 | A1* | 6/2022 | Moreno | H04L 61/2521 |
| 2023/0025586 | A1 | 1/2023 | Rolando | |

(Continued)

OTHER PUBLICATIONS

Dheeraj Chandrashekar, Cooperative Firewall Signaling over SCION, School of Electrical Engineering, Thesis, Dec. 17, 2021, 92 pgs.

*Primary Examiner* — Frantz B Jean
(74) *Attorney, Agent, or Firm* — Van Pelt, Yi & James LLP

(57) ABSTRACT

In some embodiments, a system, a process, and/or a computer program product for providing client IP persistence for traffic egressing from a distributed SASE infrastructure includes receiving traffic associated with a user application (app) session at a Secure Access Service Edge (SASE) cloud network via a proxy node; processing the traffic associated with the user app session using a security processing node (SPN), and wherein a network address translation (NAT) rule is configured for the SPN; and egressing the traffic associated with the user app session from the SASE cloud network to its original destination using a fixed public IP address based on the NAT rule to facilitate client IP persistence for all network connections associated with the user app session (e.g., the NAT rule is used in selecting the Cloud NAT with a fixed public IP address to egress the traffic).

20 Claims, 9 Drawing Sheets

(56) References Cited

U.S. PATENT DOCUMENTS

| | | | | |
|---|---|---|---|---|
| 2023/0115001 | A1* | 4/2023 | Warburton | H04L 63/0245 726/1 |
| 2023/0164059 | A1 | 5/2023 | Dawani | |
| 2023/0269191 | A1* | 8/2023 | Mestery | H04L 47/2441 370/235 |
| 2024/0039897 | A1 | 2/2024 | Gundavelli | |
| 2024/0073248 | A1* | 2/2024 | Barton | H04L 63/20 |
| 2024/0380725 | A1* | 11/2024 | Martin | H04L 61/2514 |
| 2025/0030737 | A1* | 1/2025 | Tangirala | H04L 63/0272 |
| 2025/0310864 | A1* | 10/2025 | Yadav | H04W 8/20 |
| 2026/0019811 | A1* | 1/2026 | Banerjee | H04W 8/20 |

* cited by examiner

```
cfg.saas.nat: {
proxy-proto-cookie: 0xff000000, ## default 0
src-translation-hash: 0, ## default 0. 0: src-ip stickness, 1: src_ip ^ dst_ip, 2: hash(src_ip, dst_ip, seed); others: ignored
hash-seed: 0 ## default 0. only valid when src-translation-hash is '2'.
use-proxy-proto-cookie: True, ## default False.
}

"GPCS-nat-ip-persistence; index: 1" {
        nat-type ipv4;
        from [ trust proxy ];
        source any;
        source-region none;
        to untrust;
        to-interface ethernet1/2 ;
        destination any;
        destination-region none;
        service 0:any/any/any;
        connected-gw-ip 255.0.0.0 ;
        translate-to [ "src: 10.0.1.0-10.0.1.1 (dynamic-ip-and-port) (pool idx: 3)" "    10.0.2.0-10.0.2.1 (dynamic-ip-and-port)
        (pool idx: 3)" " 10.0.11.0-10.0.11.1 (dynamic-ip-and-port) (pool idx: 3)" "];
        terminal no;
}
```

Cloud NAT Configuration

Cloud NAT 1:
alias IP range: 10.0.1.0/31    Public IP: 1.1.1.1

Cloud NAT 2:
alias IP range: 10.0.2.0/31    Public IP: 2.2.2.2

Cloud NAT 3:
alias IP range: 10.0.11.0/31    Public IP: 3.3.3.3

FIG. 2

Listening Port: Language Binding

8080: Default using geotag
8180: DE
8280: FR

German User Proxy Auto-Configuration (PAC) File:

```
function FindProxyForURL (url, host)
{
   return "PROXY http://
proxy.tenantA.prismaaccess.com:8180";
}
```

French User Proxy Auto-Configuration (PAC) File:

```
function FindProxyForURL (url, host)
{
   return "PROXY http://
proxy.tenantA.prismaaccess.com:8280";
}
```

SPN Configuration and NAT Rules:

```
cfg.saas.nat: {
     proxy-proto-cookie: [
          0x00010000, ##   DE
          0x00020000, ##   FR
           ...
     ]
}

"GPCS-nat-DE-language-localization;  index: 3"  {
       nat-type ipv4;
       from [ trust proxy ] ;
       source any;
       source-region none;
       to untrust; to-interface ethernet1/2  ;
       destination any;
       destination-region none;
       service 0:any/any/any;
       connected-gw-ip  0.1.0.0  ;
```

FIG. 8

```
    translate-to  [ "src: 10.1.1.0-10.1.1.1  (dynamic-ip-
and-port)
            (pool idx: 3) " " 10.1.2.0-10.1.2.1 (dynamic-ip-
and-port)  (pool idx: 3) "  ] ;
     terminal no;
}

"GPCS-nat-FR-language-localization; index:  4" {
      nat-type ipv4;
      from [ trust proxy ] ;
      source any;
      source-region none;
      to untrust; to-interface ethernet1/2 ;
      destination any;
      destination-region none;
      service 0:any/any/any;
      connected-gw-ip 0.2.0.0 ;
      translate-to [ "src: 10.2.1.0-10.2.1.1 (dynamic-ip-
and-port)
            (pool idx: 3) " " 10.2.2.0-10.2.2.1 (dynamic-ip-
and-port)   (pool idx: 3) " ] ;
    terminal no;
}
```

CloudNAT Configuration:

CloudNAT11:
10.1.1.0/31 - DE Public IP11

CloudNAT12:
10.1.2.0/31 - DE Public IP12

CloudNAT21:
10.2.1.0/31 - FR Public IP21

CloudNAT22:
10.2.2.0/31 - FR Public IP22

FIG. 8 (Cont.)

CLIENT IP PERSISTENCE FOR TRAFFIC EGRESSING FROM A DISTRIBUTED SERVICE ACCESS SERVICE EDGE (SASE) INFRASTRUCTURE

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRA WINGS

Various embodiments of the invention are disclosed in the following detailed description and the accompanying drawings.

FIG. 2 illustrates an example configuration and NAT rule on the security processing node (SPN) with the alias IPs from the alias IP ranges configured on the Cloud NAT Gateways to facilitate client IP persistence in accordance with some embodiments.

FIG. 8 illustrates an example configuration for port-based binding, the corresponding PAC files, and the associated NAT rules on the security processing node (SPN) instances with the alias IP addresses from the alias IP ranges configured on a cloud NAT gateway(s) in accordance with some embodiments.

DETAILED DESCRIPTION

Figure 1:
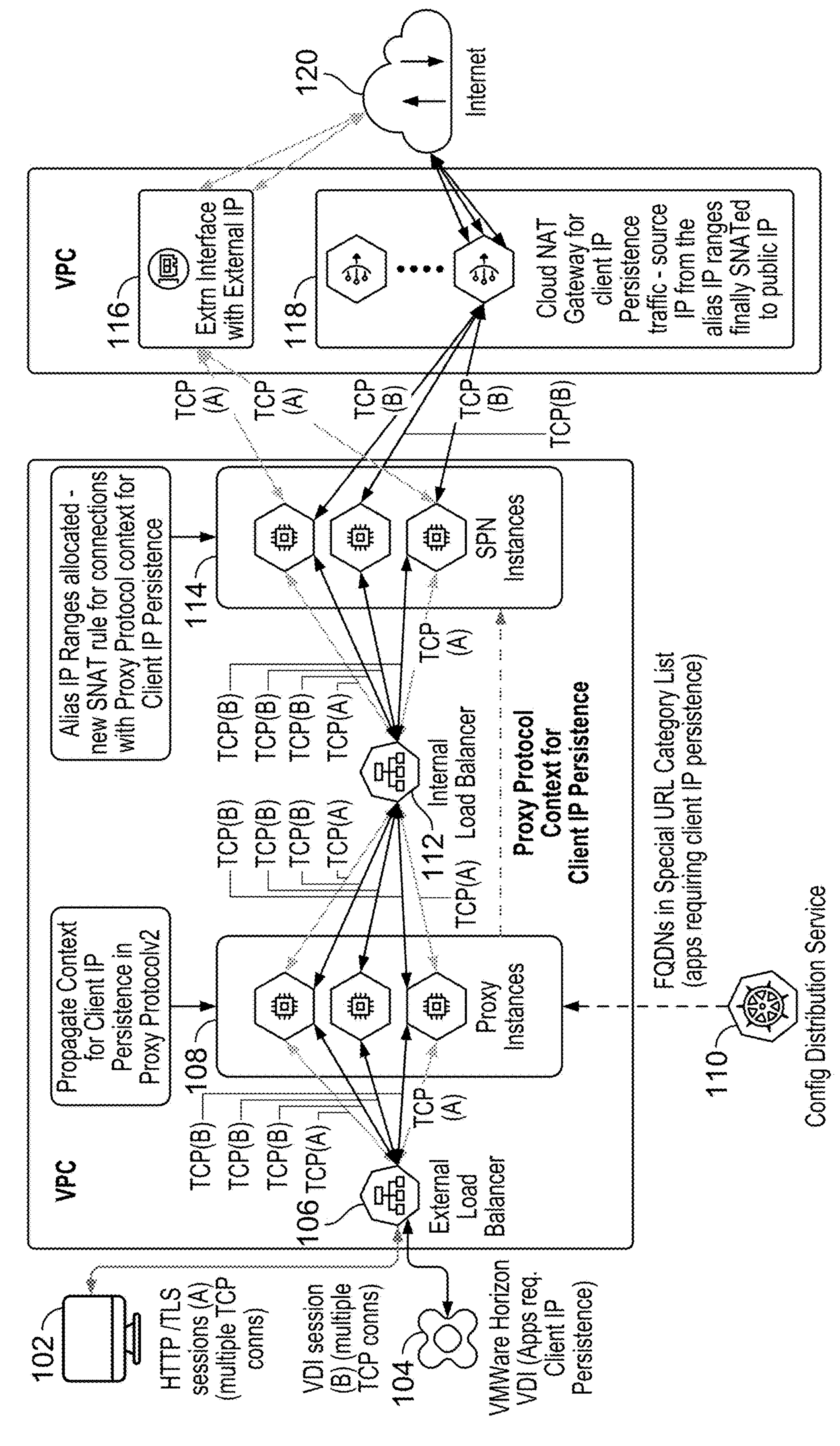
FIG. 1 is a system diagram of an architecture for providing client IP persistence for traffic egressing from a distributed Service Access Service Edge (SASE) infrastructure in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls, which can also be implemented using SD-WAN devices).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Security service providers also offer various commercially available cloud-based security solutions including various firewall, VPN, including Secure Access Service Edge (SASE), and various other security related services. For example, some security service providers have their own data centers in multiple geographies across the world to provide their customers such cloud-based security solutions.

Generally, a secure access service edge (SASE) brings together networking and network security services in a single cloud-based platform. This way, organizations can embrace cloud and mobility while reducing the complexity of dealing with multiple point products as well as saving IT, financial, and human resources.

For example, a SASE solution can generally include networking capabilities that an enterprise already uses. SASE can integrate the following networking features into a cloud-based infrastructure: SD-WAN edge devices, VPN services, and web proxying, which are each further described below.

Software-defined wide area network (SD-WAN) edge devices can provide easier connectivity for branch offices. With SASE, these devices are connected to a cloud-based infrastructure rather than to physical SD-WAN hubs located in other locations. By moving to the cloud, enterprises can eliminate the complexity of managing physical SD-WAN hubs and promote interconnectivity between branch offices.

Virtual private network (VPN) services incorporated by a SASE solution enable enterprises to route traffic through a VPN (e.g., using IPSec tunnels) to the SASE solution, and then to any application in the public or private cloud, delivered via Software as a Service (Saas), or on the Internet. Traditional VPN was used for remote access to the internal data center, but it is typically not optimized for the current/evolving cloud computing environment.

Web proxying provides an alternate means of securely connecting users to applications by inspecting web-based protocols and traffic. Proxies were typically used for web security enforcement, but due to their inherent security limitations, they are now typically used as an architectural alternative for device traffic that cannot be fully inspected (e.g., personal devices that cannot accept an endpoint agent to force all web and non-web traffic through security inspection). When implemented as part of a SASE solution, proxies can offer organizations with legacy architectures an easier way of adopting the more robust security capabilities SASE has to offer.

In addition, SASE can incorporate the network security service tools enterprises have generally relied upon in prior computing environments. In a comprehensive SASE solution, the following security services can be delivered through a cloud-based infrastructure: zero trust network access (ZTNA), firewall/security as a service (FWaaS), secure web gateways (SWG), data loss prevention (DLP), and cloud access security broker (CASB), which are each further described below.

Zero Trust Network Access (ZTNA) applies the Zero Trust secure computing approach (e.g., never trust, always verify) to the cloud computing environment. For example, ZTNA can be applied to require that every user authenticate to access the cloud, restricting access and minimizing the risk of, for example, data loss. However, ZTNA solutions based on a software-defined perimeter (SDP) model can lack content inspection capabilities needed for consistent security protection for enterprises. Also, moving to a cloud-based SASE infrastructure can eliminate the complexity of connecting to a gateway. For example, users, devices, and apps can be identified no matter where they connect from, and the below further described ZTNA solutions of protecting applications can be applied across all services, including data loss prevention (DLP) and threat prevention.

Firewall as a service (FWaaS) provides next-generation firewall features in the cloud computing environment (e.g., also referred to herein as the cloud), thereby removing the need for physical hardware at branch and retail locations. For example, SASE solutions can integrate FWaaS into its cloud-based platform, allowing simplified management and deployment.

Overview of Techniques for Providing Client Ip Persistence for Traffic Egressing from a Distributed SASE Infrastructure Technical and security challenges with providing Secure Access Service Edge (SASE) solutions exist.

Secure Access Service Edge (SASE) generally refers to providing converged network and security as a service capabilities, including Software Defined Wide Area Networking (SD-WAN), Secure Web Gateway (SWG), Cloud Access Security Broker (CASB), firewall as a service (e.g., using a Network Gateway Firewall (NGFW), which can be implemented using a VM-based or container-based firewall, such is in a cloud-based computing environment), and Zero Trust Network Access (ZTNA).

More specifically, there exists a need for improved integration for mobile networks with SASE solutions as a Service, which can address the security and technical challenges including the need to provide for client IP persistence for traffic egressing from a distributed SASE infrastructure, such as will now be described below.

For zero trust network service and SaaS application (e.g., Office 365, GSuite, Workday, etc.) access, users expect the same service quality irrespective of their access location. This expectation was driven at least in part by the increased remote work experience during the recent pandemic whereby remote workers required the same access and quality experience as they are used to in an office setting with perimeter security enforced by services, such as firewalls, IDS/IPS, Secure Web Gateways, etc.

In modern cloud delivered services, for location agnostic experience, the user's traffic is intermediated by security services, such as a Cloud Access Security Broker (CASB), a Secure Web Gateway (SWG), a FWaaS, and/or other security services. The access and the security part is being converged and is now a de facto standard in the industry, whereby a single solution provides the networking glue as access to the distributed security services across the globe as delivered by SASE solutions, such as commercially available from Palo Alto Networks, Inc., which is headquartered in Santa Clara, CA, and other vendors.

However, designing a SASE infrastructure including SWGs presents the technical challenge of distributing traffic across large scale Security Processing Node (SPN) instances while also allowing user traffic to achieve client IP persistence from the perspective of certain cloud and SaaS apps.

As an example, in the Prisma Access (PA) Explicit Proxy (EP), which is included in the SASE solution provided by Palo Alto Networks, Inc., traffic egresses to the Internet using an external IP address dedicated to the SPN instance. Coupled with the distribution of TCP connections using the Load Balancer (LB) (e.g., a Network LB or a Proxy LB) to Proxy instances, and the distribution of connections to the SPN instances (e.g., using an Internal LB), multiple TCP connections for the same user session (e.g., browser session for an online application (app) such as a banking app, etc., virtual desktop infrastructure (VDI) user sessions, identity provider (IdP) user session, etc.) can land on different SPN instances and hence can egress using different external IP addresses.

This leads to multiple problems as described below due to the sprawl in the egress IP addresses. It is noted that as described in this example, SWGs can be generally addressed as Security Processing Nodes (SPNs), such as further described below. Also, while this example is illustrated in the context of the commercially available PA SASE solution, such technical challenges are similarly applicable to other existing, commercially available SASE solutions.

Broken Client IP Persistence. When a particular user traffic/session egresses from different SPNs, the origin server sees multiple source IP addresses in use for the same user session. This can break many applications (apps), such as VDI apps and IdP apps that typically require all the TCP connections of a user session to use the same source IP address. As such, the client IP persistence is broken, because of the need to distribute the TCP connections for load balancing across multiple SPNs, and each SPN using a unique source IP for egressing traffic.

Cumbersome IP Allow Listing. Sprawl in the egress IP lists is painful for IP allow listing as these allow lists can be large, especially when a customer has a large number of SPN instances across different PA compute locations.

In addition to the above-described technical problems of Client IP persistence, support for language localization in the PA EP can result in an explosion in the number of egress IP addresses as each supported PA edge location (aka language, e.g., PA Germany Central compute location supports more than twenty edge locations for languages, such as Hungarian, Czech, Slovak, etc.) will need at least one egress IP (e.g., on each of the SPN instances) local to the supported languages.

Thus, what are needed are new and improved solutions for monitoring such network traffic and applying intelligent security for zero trust in mobile network environments using a SASE solution, which effectively and efficiently addresses the technical challenge of distributing traffic across large scale Security Processing Node (SPN) instances while also allowing user traffic to achieve client IP persistence from the perspective of certain cloud and SaaS apps.

Accordingly, new and improved techniques for providing client IP persistence for traffic egressing from a distributed SASE infrastructure are disclosed. The disclosed techniques for providing client IP persistence for traffic egressing from a distributed SASE infrastructure will now be further described below.

In some embodiments, a system, a process, and/or a computer program product for providing client IP persistence for traffic egressing from a distributed SASE infrastructure includes receiving traffic associated with a user application (app) session at a Secure Access Service Edge (SASE) cloud network via a proxy node; processing the traffic associated with the user app session using a security processing node (SPN), and wherein a network address translation (NAT) rule is configured for the SPN; and egressing the traffic associated with the user app session from the SASE cloud network to its original destination using a fixed public IP address based on the NAT rule to facilitate client IP persistence for all network connections associated with the user app session.

In some embodiments, the SPN is an instance in a cluster of SPNs for a region of the SASE cloud network, in which each of a plurality of SPNs in the cluster of SPNs for the region of the SASE cloud network is configured with the same NAT rule.

In some embodiments, the traffic is egressed from the SASE cloud network using a cloud NAT gateway to its original destination using the fixed public Internet Protocol (IP) address based on the NAT rule to facilitate client IP persistence for Transmission Control Protocol (TCP) connections associated with the user app session.

In some embodiments, the traffic is egressed from the SASE cloud network using a cloud NAT gateway to its original destination using the fixed public IP address based on the NAT rule to facilitate client IP persistence for Transmission Control Protocol (TCP) connections associated with the user app session, in which each cloud NAT gateway in a cluster of cloud NAT gateways for a region of the SASE cloud network is associated with a public IP address to use as an egress IP address for source NAT (SNAT).

In some embodiments, a binding between the SPN and a cloud NAT gateway is determined at least in part by a type of client IP persistence to use including the following: (1) client IP address and destination IP address; and/or (2) client IP address.

In some embodiments, a binding between the SPN and a cloud NAT gateway is determined at least in part by a hashing algorithm and a type of client IP persistence to use including the following: (1) client IP address and destination IP address; and/or (2) client IP address.

In some embodiments, a binding between the SPN and a cloud NAT gateway is determined at least in part by a consistent hashing algorithm and a type of client IP persistence to use including the following: (1) client IP address and destination IP address; and/or (2) client IP address, and wherein the consistent hashing algorithm reduces disruption to an alias IP selection for multiple TCP connections at a time of the NAT rule update for a scale out of cloud NAT gateway instances in a cloud NAT gateway cluster for a region of the SASE cloud network.

In some embodiments, the SPN includes a firewall as a service (FWaaS).

In some embodiments, the SPN includes a firewall as a service (FWaaS) that is configured with a security policy associated with a tenant of a SASE service.

In some embodiments, the SPN includes a firewall as a service (FWaaS) that is configured with a security policy that is based on contextual information associated with the user app session.

In some embodiments, the SPN includes a firewall as a service (FWaaS) that is configured to perform Uniform Resource Link (URL) filtering for the traffic associated with the user app session.

In some embodiments, the SPN includes a firewall as a service (FWaaS) that is configured to perform application Denial of Service (DoS) detection for the traffic associated with the user app session.

In some embodiments, the SPN includes a firewall as a service (FWaaS) that is configured to perform application Denial of Service (DoS) prevention for the traffic associated with the user app session.

In some embodiments, a system, a process, and/or a computer program product for providing client IP persistence for traffic egressing from a distributed SASE infrastructure further includes determining a security policy to apply at the SPN to the user app session based on contextual information associated with the user app session; and egressing the traffic associated with the user app session from the SASE cloud network to its original destination if allowed by the security policy, and block or drop the traffic associated with the user app session from the SASE cloud network if not allowed by the security policy.

In another embodiment, a system, a process, and/or a computer program product for using a proxy protocol to dynamically request client IP persistence for traffic associated with selected applications (apps) and/or destinations egressing from a distributed SASE infrastructure is disclosed. For example, nodes, such as tunnel termination endpoints (e.g., SASE Remote Network (RN) nodes), full proxy termination endpoints (e.g., SASE explicit proxy (EP) nodes, such as further described below), etc., can dynamically determine if the apps or user traffic requires client IP persistence and propagate the request for same to the SPN entities/instances. Specifically, the SASE nodes can determine a requirement for client IP persistence based on apps, user ID, source IP, etc. The configuration path propagates the FQDNs of the apps, that require client IP persistence, via a URL category list or an External Dynamic List (EDL), while the URL category list does not change and is a one-time created configuration object, in which the EDL can change dynamically independent of the configuration path. The type of persistence to use can be a configurable value on each SPN, or it can be a dynamic value requested by the SASE EP per app access (e.g., it can be extended to include traffic identified based on apps, or user id, source IP, etc.). In an example implementation, the configuration path can propagate two URL category lists, such as (1) for requesting persistence by applying hashing on Client IP or source IP; and (2) for requesting persistence by applying hashing on the tuple <Client IP, Destination IP>.

In yet another embodiment, a system, a process, and/or a computer program product for providing a scalable cookie-based solution in a NAT rule to select an alias IP address determining the Cloud NAT Gateway for the egress from a distributed SASE infrastructure is disclosed. For example, using a cookie type of attribute (e.g., connected-gw-ip attribute in a NAT rule configured on a security processing node (SPN)) allows for an efficient matching of the NAT rule for client IP persistence. In an example implementation, a single NAT rule supports multiple Cloud NAT Gateways in a compute region of the distributed SASE infrastructure. Each NAT rule can host alias IPs from all the alias IP ranges associated with all the Cloud NAT Gateways in the compute region of the distributed SASE infrastructure.

In a further embodiment, using metrics from the control plane of cloud NAT gateways in a compute region of a distributed SASE infrastructure to dynamically scale out the cloud NAT gateway layer/cluster and dynamically update the NAT rule (e.g., on the SPNs in the compute region of the distributed SASE infrastructure), with the alias IP addresses is disclosed. These metrics can include, for example, (1) port utilization on the cloud NAT gateways; and/or (2) packets dropped due to failure of a cloud NAT gateway to allocate ports to the new TCP sessions.

In yet a further embodiment, scaling SPN resource usage in a region while still ensuring client IP persistence for an end user is disclosed. Scaling Down SPN compute resource usage completely to zero instances (e.g., 0_vCPU) in a region by offloading users to another region is disclosed. Scaling Up SPN compute resource usage in a region to offer the service from a PA Compute region that is closer to the end user is disclosed.

As such, new and improved techniques for providing client IP persistence for traffic egressing from a distributed SASE infrastructure will now be further described below.

Example System Architectures for Providing Client IP Persistence for Traffic Egressing from a Distributed SASE Infrastructure SASE generally refers to a cloud-based architecture that combines network and security functions into a single service. SASE delivers these services directly to the source of the connection, rather than through a data center. Various commercially available SASE solutions are provided by security vendors, including, for example, Palo Alto Networks, Inc., headquartered in Santa Clara, CA.

As similarly discussed above, providing a SASE infrastructure including SWGs has the technical challenge of distributing traffic across large scale Security Processing Node (SPN) instances while allowing user traffic to achieve client IP persistence from the perspective of certain cloud and SaaS applications (apps).

Specifically, using an existing SASE solution as a use case example, referred to herein as the Prisma Access Explicit Proxy (PA EP) solution, which is commercially available from Palo Alto Networks, Inc., headquartered in Santa Clara, CA, network traffic egresses to the Internet using an external IP address dedicated to the Prisma Access (PA) SPN virtual machine (VM). Coupled with the distribution of transmission control protocol (TCP) connections using a load balancer (LB) (e.g., a network LB or a proxy LB) to Proxy VMs, and distribution of connections to the SPN VMs (e.g., using an Internal LB), including, for example, multiple TCP connections for the same user session (e.g., browser session for an application (app) such as a banking app, virtual desktop infrastructure (VDI) user sessions, identity provider (IdP) user sessions, etc.) can land on different SPN VMs. As a result, such TCP connections can then egress using different external IP addresses.

These TCP connections egressing from the SASE solution using distinct external IP addresses can result in various technical problems as described below due to the sprawl in the egress IPs.

Broken client IP persistence is a first example technical problem that can result from these TCP connections egressing from the SASE solution using distinct external IP addresses. Specifically, when traffic egresses from different SPNs, the origin server observes multiple source IP in use for the same user session. This can break many apps, such as VDI apps and IdP apps, which generally require all the TCP connections of a user session to use the same source IP address.

Cumbersome IP whitelisting is a second example technical problem that can result from these TCP connections egressing from the SASE solution using distinct external IP addresses, which results in sprawl in the egress IPs. Specifically, sprawl in the egress IP lists causes technical challenges for IP allow listing (e.g., listing of allowed IP addresses) as these lists can be large in size, especially when the customer has a large number of SASE VMs (e.g., SPN VMs) across different SASE compute locations (e.g., PA compute locations).

In addition to the above-described technical challenges associated with client IP persistence for SASE solutions, support for language localization in SASE solutions can also result in a significant increase in the number of egress IPs as each supported edge location (e.g., PA edge location, as an example, the PA Germany Central compute location supports about two dozen edge locations for languages, such as Hungarian, Czech, Slovak, etc.) generally requires at least one egress IP (e.g., on each of the SPN VMs) local to the supported languages (e.g., to support Hungarian language an IP address with geolocation attributes of Hungary would be required, thus, in PA Germany Central, SPN VM will have Hungary as an edge location with the Hungarian IP as the egress IP).

As such, new and improved techniques for providing client IP persistence for traffic egressing from a distributed SASE infrastructure will now be further described below.

FIG. 1 is a system diagram of an architecture for providing client IP persistence for traffic egressing from a distributed Service Access Service Edge (SASE) infrastructure in accordance with some embodiments.

Specifically, FIG. 1 illustrates an example implementation of a SASE explicit proxy architecture with egress network address translation (NAT) for client IP Persistence (e.g., in which the TCP connections associated with a user session, such as from an endpoint 102 executing a user session with multiple HTTP/TLS connections (e.g., associated with multiple TCP connections). FIG. 1 also shows a VDI entity (VMWare Horizon VDI for apps requiring client IP persistence) 104 executing a VDI session (e.g., associated with multiple TCP connections) egress from the same Cloud NAT Gateway 118, such as will be further described below with respect to FIG. 1). For example, the disclosed techniques can be implemented for a SASE Prisma Access (PA) explicit proxy architecture with egress NAT for client IP Persistence (e.g., or another commercially/publicly available SASE solution).

The disclosed SASE explicit proxy architecture supports egress NAT using Cloud NAT. Specifically, Cloud NAT Gateway entities/instances 118 are instantiated, in each SASE compute region (e.g., US East, US Central, US West, Europe, Asia, etc.), configured with an alias IP range and the public IP address to use for the source IP NAT translation. More specifically, the Cloud NAT Gateway 118 performs the source IP NAT translation (SNAT) such that this public IP becomes the egress/source IP for the TCP connections associated with the user sessions (e.g., HTTP/TLS sessions from endpoint 102 and/or VDI sessions from VDI 104) that are sent out to the Internet 120 from the SASE compute environment as shown in FIG. 1 (e.g., which can be provided using a commercially available Google Cloud Platform (GCP) compute environment and/or other commercially available cloud computing solutions, such as from Amazon Web Services (AWS), Microsoft Azure, etc.).

Security processing node (SPN) instances as shown at 114 (e.g., VM instances of instantiated firewalls as a service (FWaaS) instances) in FIG. 1 are configured with an alias IP subrange (e.g., /30 or /31) allocated from all the alias IP ranges (e.g., these ranges can be, for example, /23) in use whereby each alias IP range is dedicated to one Cloud NAT Gateway entity/instance. In this example implementation, each SPN instance has a SNAT rule provisioned so that the client traffic/sessions coming from any of the Proxy instances as shown at 108 (e.g., a cluster of EP instances), which are in communication with the SPN instances 114 (e.g., a cluster of FWaaS instances) via an internal load balancer (ILB) 112, are destined to a destination IP egresses out from the SPN instance with an alias IP as the source IP address, in which the alias IP is selected based on the hash value of the tuple <client IP, destination IP> or just <client IP> (e.g., based on a tenant preferred configuration, thus, support is provided for persistence on <client IP, destination IP> tuple or on the client IP address alone). In this example implementation, the disclosed proxy protocol is used to carry context from the proxy to the SPN, and this context informs the SPN to provide the IP persistence service. As also shown in FIG. 1, an external load balancer (ELB) 106 is provided for workload balancing the TCP connections incoming into the SASE compute environment to the multiple different Proxy instances 108.

As also shown in FIG. 1, the disclosed SASE explicit proxy architecture allows the Explicit Proxy (EP) nodes (e.g., shown as Proxy Instances 108 in FIG. 1) to request client IP persistence from the FWaaS nodes (e.g., shown as SPN instances 114 in FIG. 1) selectively for apps using a Configuration (config) Distribution Service 110. In this example implementation, the config path propagates the FQDNs of the apps, that require client IP persistence, via a URL category list or an External Dynamic List (EDL). When these lists are populated, the EP propagates a context, for client IP persistence, to the SPN based on the appropriate match of the FQDN in the TLS SNI or HTTP Host header against this list. As such, this propagated context is used to identify the NAT rule (e.g., this attribute is connected-gateway-IP in a configured NAT rule, such as further described below with respect to FIG. 2) to use for egressing this traffic to the Internet 120 as shown at 118 in FIG. 1.

In another example implementation, the Proxy instance can be in the same VM as the SPN instance (e.g., FWaaS instance). In this example implementation, the shared client IP persistence is provided via an inter process communication.

As shown in FIG. 1, for TCP connections associated with HTTP/TLS sessions for an endpoint, such as endpoint 102, these external communications to the Internet are provided using an external interface with an external IP address as shown at 116. For TCP connections associated with VDI sessions for an endpoint, such as VMWare Horizon VDI (for apps requiring client IP persistence) 104, these external communications to the Internet are provided using the Cloud NAT gateway for client IP persistence traffic with the source IP address from the alias IP ranges finally SNATed to the public IP address as shown at 118. As such, traffic that does not need client IP persistence can be steered to egress without Cloud NAT.

FIG. 2 illustrates an example configuration and NAT rule on the security processing node (SPN) with the alias IPs from the alias IP ranges configured on the Cloud NAT Gateways to facilitate client IP persistence in accordance with some embodiments.

Referring to FIG. 2, the disclosed SASE explicit proxy architecture also allows the traffic from the EP instances (108) to egress using client IP persistence when there is no URL category or EDL configured for selective client IP persistence (e.g., via Config Distribution Service 110, such as similarly described above). To achieve this, a NAT option is provided that facilitates control/configuration of the types of NAT persistence that is desired. Specifically, in an example implementation, when there is no URL category configured, the proxy instance requests client IP persistence for all the traffic from the SPN (i.e., there is no discrimination on the proxy node as to which set of traffic gets client IP persistence). As such, the type of persistence is independent of the proxy's decision to request persistence from the SPN.

As an example, SPN instance 114 processes a packet, of a connection that is requesting persistence, it encodes a 'proxy-protocol-cookie' (e.g., 0xff000000, 255.0.0.0) into the session. As such, when this packet egresses out from the SPN instance, it uses the packet information (e.g., source zone, destination zone, source, destination, . . . ) as well as the 'proxy-protocol-cookie' from the session (e.g., as shown in FIG. 2) to match the NAT rules.

As illustrated by the example NAT rule shown in FIG. 2, it will match the rule "GPCS-nat-ip-persistence" and use the value of "src-translation-hash" (e.g., 0: src-ip only persistent) to compute a hash value, from the source IP, which is used to index into the list of IP addresses in the "translate-to" to use as the exact NATed source IP address.

When the Cloud NAT Gateway processes the IP packets with the source IP address (e.g., one of 10.0.1.0/31 in the example rule in FIG. 2) in the alias IP range (e.g., 10.0.0.1/23, etc.), it uses the public IP address (e.g., configured on the Cloud NAT Gateway 118 in correspondence with the alias IP range) to source NAT the client IP address.

Various formats can be implemented for the alias IP encoding format, such as described below for the above-described example implementation.

The alias IP can be carved from the private IP address space with the encoding as follows: 10.R(6)C(9)S(9) where R stands for Region, C stands for Cloud NAT, and S stands for the SPNs as further provided below.

Region (R) includes 6 bits to support up to 64 PA Compute Locations.

Cloud NAT (C) includes 9 bits, 5 bits for language localization accounting for the fact that Germany Central already has 22 languages, and 4 bits for scaling to get to 16 Cloud Gateways.

SPNs(S) include 9 bits, allowing for 256 SPNs if each SPN gets/31 alias IP or 128 SPNs if each SPN gets/30 alias IP.

As such, the disclosed techniques for providing client IP persistence for traffic egressing from a distributed SASE infrastructure achieve client IP persistence, because all traffic from a given client IP and destined to a given destination IP (e.g., or, origin server) egress out using the same alias IP range irrespective of which SPN (114) receives the traffic from whichever Proxy (108) as the Cloud NAT Gateway (118) performs SNAT only for the alias IP ranges allocated to it. Specifically, by using a single public IP per Cloud NAT Gateway, the egress source IP is guaranteed to be the same for all TCP connections belonging to the same, for example, <client IP, destination IP> pair.

Moreover, using the disclosed techniques for providing client IP persistence for traffic egressing from a distributed SASE infrastructure, the number of egress public IPs used by the disclosed EP solution is thereby reduced for the SASE environment, which is in a one-to-one correspondence with the number of SPN instances (e.g., EP deployments can have as large as 80 or more SPN instances in heavily trafficked compute regions, such as US East and Germany Central) without Cloud NAT Gateways.

As such, the disclosed techniques for providing client IP persistence for traffic egressing from a distributed SASE infrastructure can be provided to not force traffic for a given client to egress from the same SPN. Forcing traffic from a given client IP to the same SPN is achievable on the LB (NLB or Proxy LB), but this approach can negatively affect horizontal scaling and SPN utilization. When using ILB (internal LB) to send traffic from a proxy to SPNs, the original client IP is lost and the IP assigned to the interface on the proxy is used to send the traffic through the ILB. Given that the ILB does not see the client IP and all client IPs are replaced by the proxy interface IP using client IP persistence on such, an LB will result in heavily skewed traffic distribution overloading some SPNs and underutilizing most SPNs. Thus, the disclosed solution builds on top of the LB load balancing traffic at the 5-tuple TCP session level, which is beneficial for SPN utilization. Also, this allows the data path to scale elastically based on SPN compute utilization.

In addition, the disclosed techniques for providing client IP persistence for traffic egressing from a distributed SASE infrastructure can be provided to facilitate client IP persistence in a 5-tuple load balanced deployment (e.g., no constraints on the fronting LB to use any specific persistence). As such, this allows the disclosed solution to provide flexible persistence for application traffic (e.g., as similarly described above, client IP persistence can be based on <Client IP, Destination IP> or <Client IP> on demand).

Further, the disclosed techniques for providing client IP persistence for traffic egressing from a distributed SASE infrastructure can be provided to facilitate an integrated mechanism to control traffic flow through the Cloud NAT (e.g., traffic that does not need client IP persistence can be steered to egress without Cloud NAT).

Also, the disclosed techniques for providing client IP persistence for traffic egressing from a distributed SASE infrastructure can be provided to facilitate flexibility to use the above-described Proxy Protocol to dynamically request Client IP Persistence from the SPNs for selected apps and destinations. For example, such an approach provides for optimal use of Cloud NAT resources, reducing costs and churn on the control plane of the Cloud NAT, which in turn provides better data path performance as there are few port allocation events.

Finally, the disclosed techniques for providing client IP persistence for traffic egressing from a distributed SASE infrastructure can be provided to allow for us to seamlessly bring in or take out compute resources in a given SASE compute region to offer the best end-user experience while still retaining the egress client IP persistence for the end user. For example, this extends to also bringing in additional SPNs in new SASE compute regions and moving users over to these new SPNs.

Accordingly, in some embodiments, the disclosed techniques for providing client IP persistence for traffic egressing from a distributed SASE infrastructure (e.g., including for applying intelligent security for zero trust) can be provided using security processing nodes (SPNs) (e.g., the security function(s)/platform(s) can be implemented using Palo Alto Networks' Prisma Access FWaaS, a firewall (FW)/Next Generation Firewall (NGFW), a network sensor acting on behalf of the firewall, or another (virtual) device/component that can implement a firewall as a service entity for enforcing one or more security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques, including using SD-WAN devices and/or clusters executing firewall as a service entities) and are configured to provide deep packet inspection (DPI) capabilities (e.g., including stateful inspection) of, for example, user/VDI sessions (e.g., user/VDI sessions associated with TCP connections related traffic) provided to the SASE solution via an EP to apply security on the network traffic using an SPN based on a policy (e.g., layer-7 security and/or other security policy enforcement) as similarly described herein.

Example use cases for the disclosed techniques for providing client IP persistence for traffic egressing from a distributed SASE infrastructure will be further described below.

Example Use Cases for Client IP Persistence for Traffic Egressing from a Distributed SASE Infrastructure Example use cases for the disclosed techniques for providing client IP persistence for traffic egressing from a distributed SASE infrastructure will now be described below.

As a first example use case, some customers require their user traffic to egress with the same IP for all the duration of a particular user session (i.e., all the TCP connections of the user session must egress using the same source IP), which is often a requirement for correct functioning of certain apps as similarly described above, such as VDI, IdPs, and services such as Cloudflare providing captcha to the apps, etc.

As an example, apps such as VMWare Horizon VDI, are negatively affected because of the multiple egress IPs for the same user session. These VDI apps are typically behind a load balancer (LB) and may rely on the client IP for source affinity so that all the multiple TCP connections for the same client session (e.g., which encompasses authentication flow, Remote Desktop Protocol (RDP), Meet-Me-Room (MMR), PC over IP (PCOIP), and other media flows) land on the same VDI appliances.

As another example, consumers of apps, which are using Cloudflare for Botnet protection services, when using the PA EP to access these apps, can confront technical problems with Cloudflare due to the fact that the egress IP that was used to verify the Cloudflare captcha changes for other TCP connections.

As such, the disclosed techniques for providing client IP persistence for traffic egressing from a distributed SASE infrastructure can be provided to facilitate these various example customer requirements for their user traffic and apps/VDI, etc.

As a second example use case, some customers require egress IP allow listing on their SaaS apps (e.g., and/or partners). Moreover, in some large customers, the number of EP nodes can exceed 100 nodes (e.g., exceed the limits associated with example SaaS or Partner app configurations). As such, these allow lists can become increasingly challenging to maintain without the disclosed techniques for providing client IP persistent for traffic egressing from the SASE environment.

Example process embodiments of the disclosed techniques for providing client IP persistence for traffic egressing from a distributed SASE infrastructure will be further described below.

Figure 3:
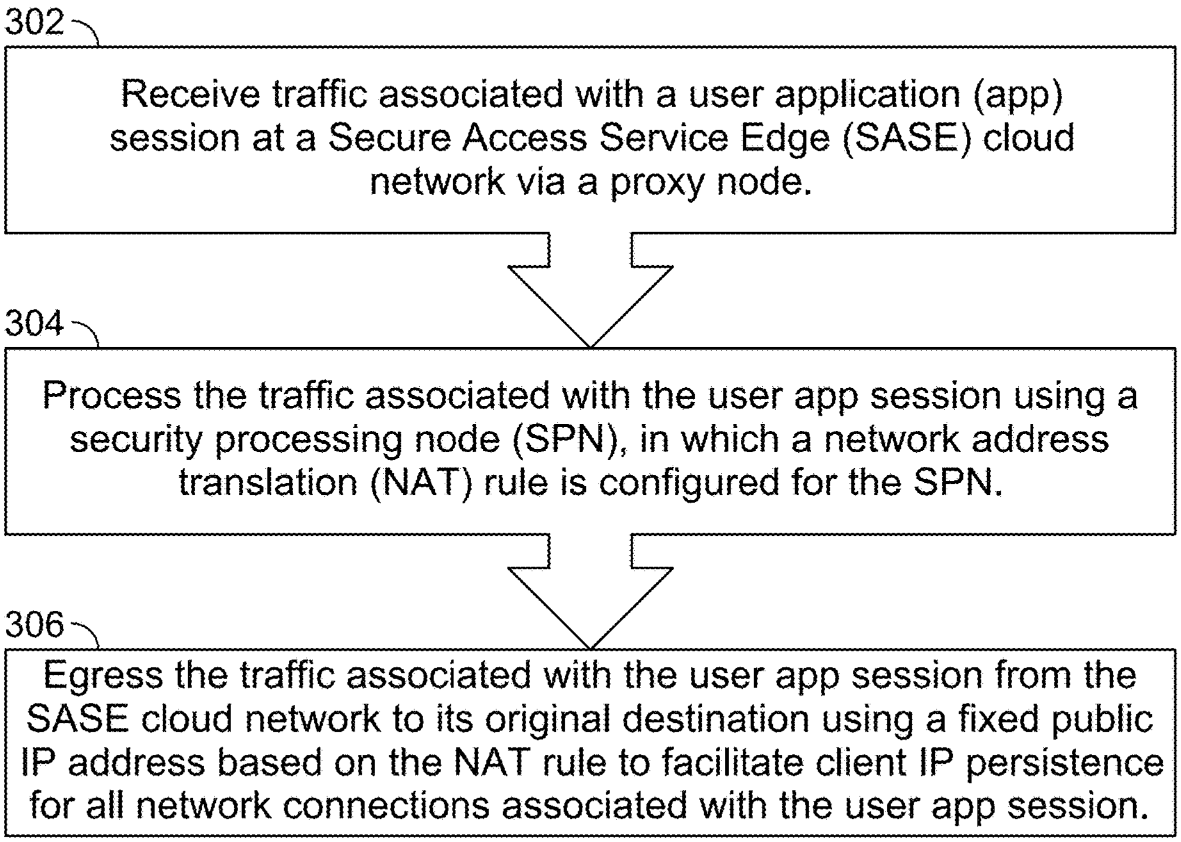
FIG. 3 is a flow diagram of a process for providing client IP persistence for traffic egressing from a distributed SASE infrastructure in accordance with some embodiments.

Example Process Embodiments for Client IP Persistence for Traffic Egressing from a Distributed SASE Infrastructure FIG. 3 is a flow diagram of a process for providing client IP persistence for traffic egressing from a distributed SASE infrastructure in accordance with some embodiments. In some embodiments, a process as shown in FIG. 3 is performed by the SASE solution and techniques as similarly described above including the embodiments described above with respect to FIGS. 1 and 2. In one embodiment, the process shown in FIG. 3 is performed, at least in part, by SPN entities/clusters as described above with respect to FIG. 1.

The process begins at 302. At 302, traffic associated with a user application (app) session is received at a Secure Access Service Edge (SASE) cloud network via a proxy node (e.g., an Explicit Proxy (EP) instance, such as similarly described above with respect to FIG. 1).

At 304, the traffic associated with the user app session is processed using a security processing node (SPN), in which a network address translation (NAT) rule is configured for the SPN. For example, a given compute region of the SASE cloud environment can include a cluster of SPNs that are configured with the same NAT rule, such as similarly described above with respect to FIG. 1. An example NAT rule is illustrated in and described above with respect to FIG. 2.

At 306, the traffic associated with the user app session is egressed from the SASE cloud network to its original destination using a fixed public IP address based on the NAT rule to facilitate client IP persistence for all network connections associated with the user app session.

Figure 4:
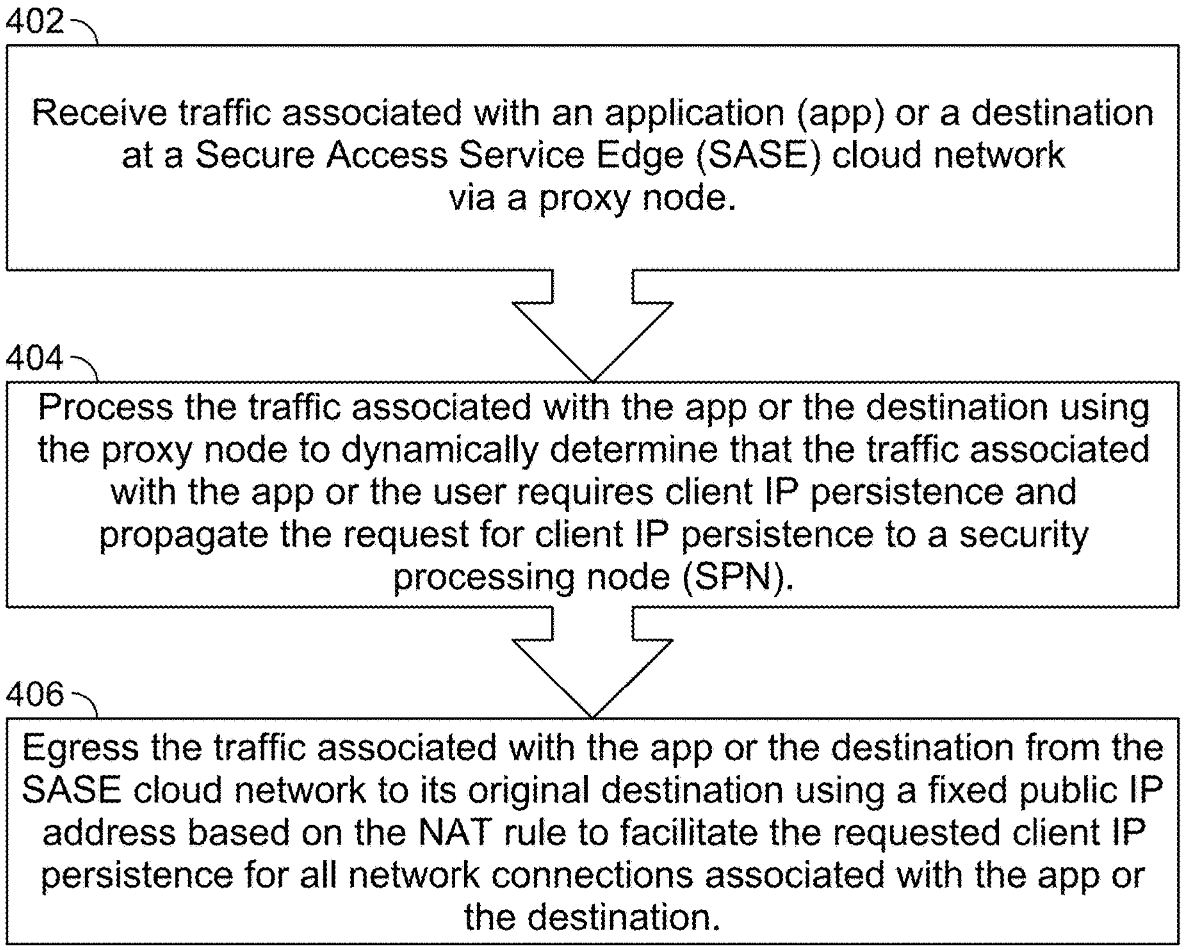
FIG. 4 is a flow diagram of a process for using a proxy protocol to dynamically request client IP persistence for traffic associated with selected applications (apps) and/or destinations egressing from a distributed SASE infrastructure in accordance with some embodiments.

FIG. 4 is a flow diagram of a process for using a proxy protocol to dynamically request client IP persistence for traffic associated with selected applications (apps) and/or destinations egressing from a distributed SASE infrastructure in accordance with some embodiments. In some embodiments, a process as shown in FIG. 4 is performed by the SASE solution and techniques as similarly described above including the embodiments described above with respect to FIGS. 1 and 2. In one embodiment, the process shown in FIG. 4 is performed, at least in part, by SPN entities/clusters as described above with respect to FIG. 1.

The process begins at 402. At 402, traffic associated with an application (app) or a destination is received at a Secure Access Service Edge (SASE) cloud network via a proxy node (e.g., an Explicit Proxy (EP) instance, such as similarly described above with respect to FIG. 1).

At 404, the traffic associated with the app or the destination is processed using the proxy node to dynamically determine that the traffic associated with the app or the user requires client IP persistence and propagate the request for client IP persistence to a security processing node (SPN). For example, a given compute region of the SASE cloud environment can include a cluster of SPNs that are configured with the same NAT rule, such as similarly described above with respect to FIG. 1. An example NAT rule is illustrated in and described above with respect to FIG. 2.

At 406, the traffic associated with the app or the destination is egressed from the SASE cloud network to its original destination using a fixed public IP address based on the NAT rule to facilitate the requested client IP persistence for all network connections associated with the app or the destination.

For example, nodes, such as tunnel termination endpoints (e.g., SASE Remote Network (RN) nodes), full proxy termination endpoints (e.g., SASE explicit proxy (EP) nodes, for example, executed as a Proxy, such as further described below), etc., can dynamically determine if the app or user traffic requires client IP persistence and propagate the request for same to the SPN entities/instances. Specifically, the EP nodes can determine a requirement for client IP persistence based on application identification (app ID), user ID, source IP, etc. The configuration path propagates the FQDNs of the apps that require client IP persistence, via a URL category list or an External Dynamic List (EDL), while the URL category list does not change and is a one-time created configuration object, in which the EDL can change dynamically independent of the configuration path. The type of persistence to use can be a configurable value on each SPN, or it can be a dynamic value requested by the SASE EP per app access (e.g., it can be extended to include traffic identified based on app ID, or user ID, source IP, etc.). In an example implementation, the configuration path can propagate two URL category lists, such as (1) for requesting persistence by applying hashing on the Client IP or source IP; and (2) for requesting persistence by applying hashing on the tuple <Client IP, Destination IP>.

Figure 5:
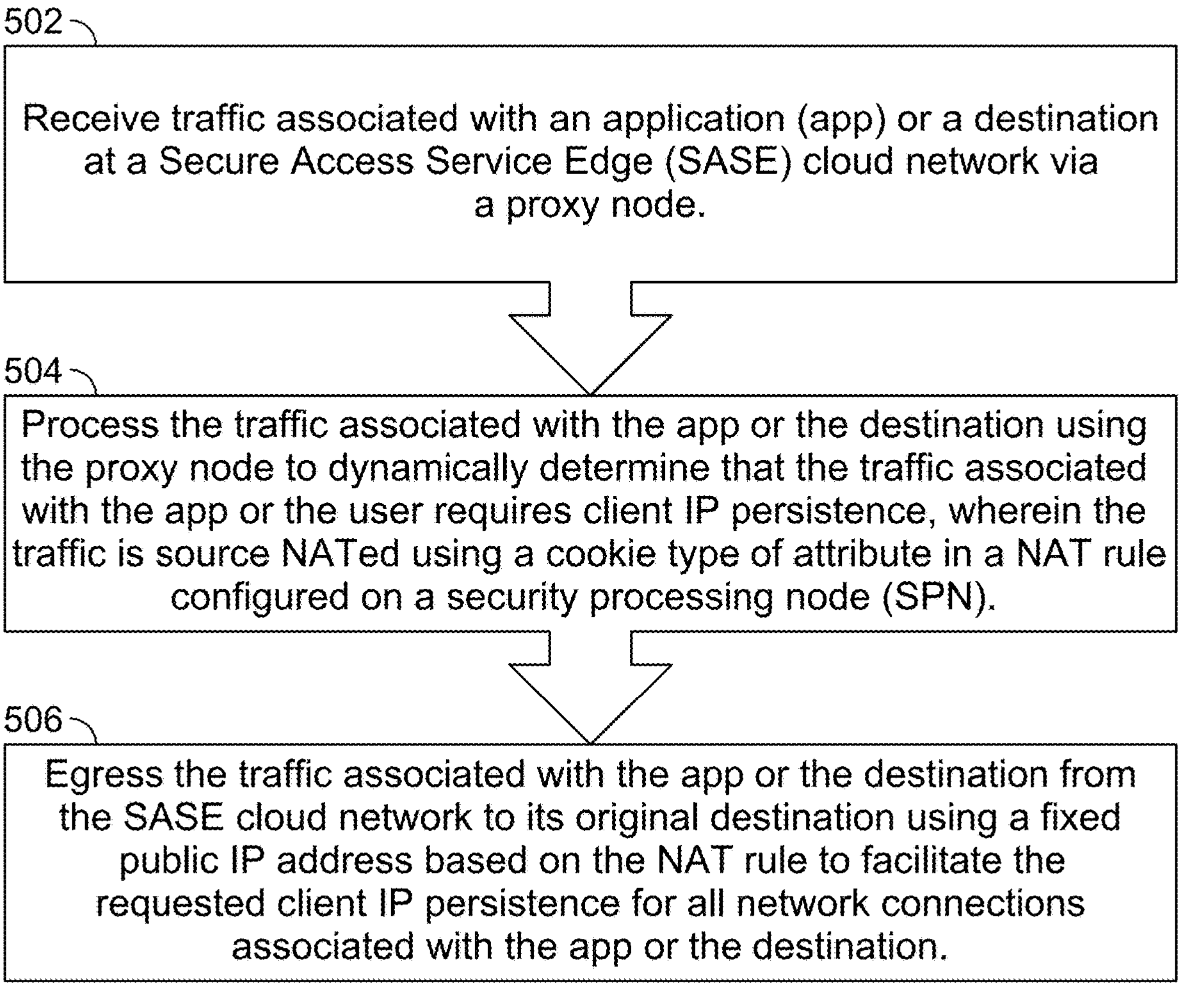
FIG. 5 is a flow diagram of a process for providing a scalable cookie-based solution in a NAT rule to select an alias IP address determining a cloud NAT gateway for the egress from a distributed SASE infrastructure in accordance with some embodiments.

FIG. 5 is a flow diagram of a process for providing a scalable cookie-based solution in a NAT rule to select an alias IP address determining a cloud NAT gateway for the egress from a distributed SASE infrastructure in accordance with some embodiments. In some embodiments, a process as shown in FIG. 5 is performed by the SASE solution and techniques as similarly described above including the embodiments described above with respect to FIGS. 1 and 2. In one embodiment, the process shown in FIG. 5 is performed, at least in part, by SPN entities/clusters as described above with respect to FIG. 1.

The process begins at 502. At 502, traffic associated with an application (app) or a destination is received at a Secure Access Service Edge (SASE) cloud network via a proxy node (e.g., an Explicit Proxy (EP) instance, such as similarly described above with respect to FIG. 1).

At 504, the traffic associated with the app or the destination is processed using the proxy node to dynamically determine that the traffic associated with the app or the user requires client IP persistence, wherein the traffic is source NATed using a cookie type attribute of a NAT rule configured on a security processing node (SPN). For example, a given compute region of the SASE cloud environment can include a cluster of SPNs that are configured with the same NAT rule, such as similarly described above with respect to FIG. 1. An example NAT rule is illustrated in and described above with respect to FIG. 2.

At 506, the traffic associated with the app or the destination is egressed from the SASE cloud network to its original destination using a fixed public IP address based on the NAT rule to facilitate the requested client IP persistence for all network connections associated with the app or the destination.

For example, using a cookie type of attribute (e.g., connected-gw-ip attribute in a NAT rule configured on a security processing node (SPN)) allows for an efficient matching of the NAT rule for client IP persistence. In an example implementation, a single NAT rule supports multiple Cloud NAT Gateways in a compute region of the distributed SASE infrastructure. Each NAT rule can host alias IPs from all the alias IP ranges associated with all the Cloud NAT Gateways in the compute region of the distributed SASE infrastructure.

Overview of Techniques for Providing Language Localization for Traffic Egressing from a Distributed SASE Infrastructure Technical and security challenges with providing language localization related to Secure Access Service Edge (SASE) services also exist.

Specifically, there exists a need for improved language localization for traffic egressing from a distributed SASE infrastructure, such as will now be described below.

Technical Challenges for Web Site and Web Content Localization

As an example, web site and web content localization typically involves serving the web site pages and content according to a user's local language. This entails more than just translating the web site's content into Spanish if the user is in, for example, Mexico, or into US English if the user is in, for example, the United States. Localization may also include additional services, such as changing the currency on e-commerce shopping portals, etc.

Existing approaches to enable language localization on the server side include the following examples.

First, browser clients can send the standardized Accept-Language header in requests, then localization is performed on the server which includes a Content-Language header in responses.

Second, servers can use the source IP in the client requests to perform a geo IP lookup and perform localization dynamically based on this result to serve the content.

Accordingly, new and improved techniques for providing language localization for traffic egressing from a distributed SASE infrastructure are disclosed. The disclosed techniques for providing language localization for traffic egressing from a distributed SASE infrastructure will now be further described below.

In some embodiments, a system, a process, and/or a computer program product for providing language localization for traffic egressing from a distributed SASE infrastructure includes receiving traffic associated with a user application (app) session at a Secure Access Service Edge (SASE) cloud network via a proxy node; processing the traffic associated with the user app session using a security processing node (SPN), and wherein a source network address translation (SNAT) rule is configured for the SPN; and egressing the traffic associated with the user app session from the SASE cloud network to its original destination using a fixed public IP address based on the SNAT rule to facilitate language localization for all network connections associated with the user app session.

For example, each of a plurality of SPNs in a cluster of SPNs for each compute region of the SASE cloud network can be configured with distinct NAT rules for each supported language, in which each of the distinct NAT rules for each supported language is associated with a geography-based tag or geography-based attributes.

In some embodiments, the traffic is egressed from the SASE cloud network using a cloud NAT gateway to its original destination using the fixed public IP address based on the NAT rule to facilitate the language localization for Transmission Control Protocol (TCP) connections associated with the user app session, and each cloud NAT gateway in a cluster of cloud NAT gateways for a compute region of the SASE cloud network is associated with a distinct public IP address to use as an egress IP address for source NAT (SNAT) of a predetermined region language.

In some embodiments, a binding between the SPN and a cloud NAT gateway is determined at least in part by a geotag and/or a set of attributes to facilitate the language localization for Transmission Control Protocol (TCP) connections associated with the user app session. In some cases, a default public IP address can also be configured on a cloud NAT gateway for the app user traffic that does not require language localization or for which an associated geolocation for the user app traffic does not match a configured geotag.

In some embodiments, a binding between the SPN and a cloud NAT gateway is determined at least in part by a geotag and/or a set of attributes to facilitate the language localization for Transmission Control Protocol (TCP) connections associated with the user app session, in which the binding between the SPN and a cloud NAT gateway is further determined at least in part by a consistent hashing algorithm and a type of client IP persistence to use including the following: (1) client IP address and destination IP address; and/or (2) client IP address, and wherein the consistent hashing algorithm reduces disruption to an alias IP selection for multiple TCP connections at a time of the NAT rule update for a scale out of cloud NAT gateway instances in a cloud NAT gateway cluster for a region of the SASE cloud network In some embodiments, a Proxy Protocol or GENEVE TLVs is used to dynamically propagate a geotag for the user app session. For example, the ClientIP, which is the user's public source IP, can be used to look up in an IP-to-geo database to determine the geotag. In another example, the traffic ingress port on the Proxy can be used to look up a port-to-geo database to determine the geotag. The decision to determine the geotag can be a static configuration parameter, or it can be dynamic per app access. It can also be extended to include traffic identified based on app ID, user ID, source IP, etc. (e.g., only URLs categorized as news or travel get language localization service). Language localization context containing the geotag of the client can then be propagated using a Proxy Protocol or GENEVE TLVs from the downstream nodes to the upstream SPNs. Nodes such as tunnel termination endpoints (e.g., Prisma Access-Remote Node (PA-RN)), full proxy termination endpoints (e.g., Prisma Access-Explicit Proxy (PA-EP)), etc. can dynamically determine if the app or user traffic requires language localization and propagate that information to the SPNs. PA-EP nodes can determine a requirement for language localization based on app ID, user ID, source IP, etc. The configuration path propagates the Categories or FQDNs of the apps that require language localization, via a URL category list or an External Dynamic List (EDL), such as similarly described above with respect to FIG. 1.

In some embodiments, support for roaming SASE EP users is also provided as will be further described below.

In some embodiments, usage metrics from the control plane of the Cloud NAT Gateways can be processed to dynamically scale-out Cloud NAT gateways for a specific geolocation and dynamically update the associated NAT rule(s), on SPNs, with the alias IP addresses, such as similarly described above.

As also similarly described above, in some implementations, the Proxy instance and the SPN instance can be co-located in the same compute (e.g., either in a VM, or in a physical server, or in a construct such as a Kubernetes pod where the EP and the SPN are two containers). As such, both the Proxy and the SPN can be part of the same process and communicate using shared memory or messages and these can carry the request for the language localization.

As such, new and improved techniques for providing language localization egress NAT from a distributed SASE infrastructure will now be further described below.

Example System Architectures for Providing Language Localization for Traffic Egressing from a Distributed SASE Infrastructure SASE generally refers to a cloud-based architecture that combines network and security functions into a single service. SASE delivers these services directly to the source of connection, rather than through a data center. Various commercially available SASE solutions are provided by security vendors, including, for example, Palo Alto Networks, Inc., headquartered in Santa Clara, CA.

As similarly discussed above, providing a SASE infrastructure including SWGs has the technical challenge of distributing traffic across large scale Security Processing Node (SPN) instances while allowing user traffic to achieve client IP persistence from the perspective of certain cloud and SaaS applications (apps).

Specifically, using an existing SASE solution as a use case example, referred to herein as the Prisma Access Explicit Proxy (PA EP) solution, which is commercially available from Palo Alto Networks, Inc., headquartered in Santa Clara, CA, network traffic egresses to the Internet using an external IP address dedicated to the Prisma Access (PA) SPN virtual machine (VM). Coupled with the distribution of transmission control protocol (TCP) connections using a load balancer (LB) (e.g., a network LB or a proxy LB) to Proxy VMs, and distribution of connections to the SPN VMs (e.g., using an Internal LB), including, for example, multiple TCP connections for the same user session (e.g., browser session for an application (app) such as a banking app, virtual desktop infrastructure (VDI) user sessions, identity provider (IdP) user sessions, etc.) can land on different SPN VMs. As a result, such TCP connections can then egress using different external IP addresses.

In addition to the above-described technical challenges associated with client IP persistence for SASE solutions, support for language localization in SASE solutions can also result in a significant increase in the number of egress IPs as each supported edge location (e.g., PA edge location, as an example, the PA Germany Central compute location supports about two dozen edge locations for languages, such as Hungarian, Czech, Slovak, etc.) generally requires at least one egress IP (e.g., on each of the SPN VMs) local to the supported languages (e.g., to support Hungarian language, an IP address with geolocation attributes of Hungary would be required, thus, in PA Germany Central, the SPN VM will have Hungary as an edge location with the Hungarian IP address as the egress IP address).

As such, new and improved techniques for providing language localization for traffic egressing from a distributed SASE infrastructure will now be further described below.

Figure 6:
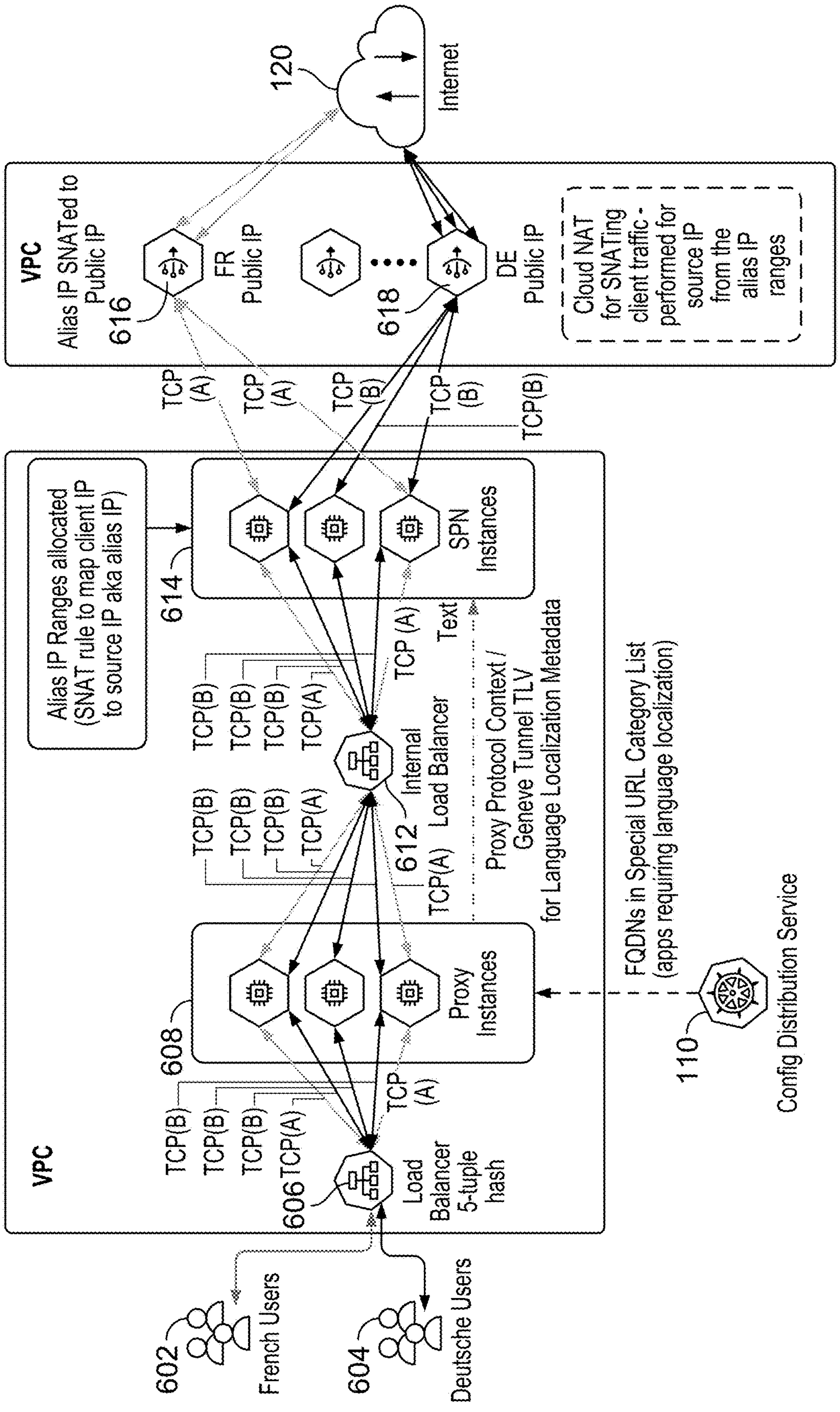
FIG. 6 is a system diagram of an architecture for providing language localization egress NAT from a distributed Service Access Service Edge (SASE) infrastructure in accordance with some embodiments.

FIG. 6 is a system diagram of an architecture for providing language localization egress NAT from a distributed Service Access Service Edge (SASE) infrastructure in accordance with some embodiments.

Specifically, designing a SASE infrastructure that includes SWGs also involves the above-described technical challenge of distributing traffic across a large cluster of Security Processing Node (SPN) instances while also allowing user traffic to achieve consistent language localization from the perspective of certain web sites, web portals, cloud and SaaS apps, etc. The disclosed techniques facilitate a solution for providing language localization using egress NAT from a distributed SASE infrastructure as will now be further described with respect to FIG. 6.

FIG. 6 illustrates an example implementation of SASE explicit proxy architecture with egress network address translation (NAT) for language localization (e.g., in which the TCP connections associated with a user session, such as from endpoints associated with French users as shown at 602 executing an HTTP/TLS app (e.g., associated with multiple TCP connections) egress from the Cloud NAT Gateway 616 using a public IP address associated with a France geography (e.g., a France-based IP address) and/or from endpoints associated with German users as shown at 604 executing an HTTP/TLS app (e.g., associated with multiple TCP connections) egress from the Cloud NAT Gateway 618 using a public IP address associated with a German geography (e.g., a Germany-based IP address), such as will be further described below with respect to FIG. 6). For example, the disclosed techniques can be implemented for a SASE Prisma Access (PA) explicit proxy architecture with egress NAT for language localization (e.g., or another commercially/publicly available SASE solution).

The disclosed SASE explicit proxy architecture supports egress NAT using Cloud NAT. Specifically, Cloud NAT Gateway entities/instances 616 and 618, etc., are instantiated, in each SASE compute region (e.g., US East, US Central, US West, Europe, Asia, etc.), configured with an alias IP range and the public IP address to use for the source IP NAT translation. More specifically, the Cloud NAT Gateway, such as shown at 618, performs the source IP NAT translation (SNAT) such that this Germany-based public IP becomes the egress/source IP for the TCP connections associated with the user sessions (e.g., HTTP/TLS sessions from endpoints associated with users shown at 604) that are sent out to the Internet 120 from the SASE compute environment as shown in FIG. 6 (e.g., which can be provided using a commercially available Google Cloud Platform (GCP) compute environment and/or other commercially available cloud computing solutions, such as from Amazon Web Services (AWS), Microsoft Azure, etc.).

Security processing node (SPN) instances as shown at 614 (e.g., VM instances of instantiated firewalls as a service (FWaaS) instances) in FIG. 6 are configured with an alias IP subrange (e.g., /30 or /31) allocated from all the alias IP ranges (e.g., these ranges can be, for example, /23) in use whereby each alias IP range is dedicated to one Cloud NAT Gateway entity/instance. In this example implementation, each SPN instance has a SNAT rule provisioned so that the client traffic coming from any of the Proxy instances as shown at 608 (e.g., a cluster of EP instances), which are in communication with the SPN instances 614 (e.g., a cluster of FWaaS instances) via an internal load balancer (ILB) 612 (e.g., a 5-tuple hash load balancer (LB)), and destined to a destination IP egresses out from the SPN instance with an alias IP as the source IP address, in which the alias IP is selected based on the language/localization associated with the user (e.g., egress traffic associated with French users 602 to be SNATed to a France-based public IP address, egress traffic associated with German users 604 to be SNATed to a Germany-based public IP address, etc.). In this example implementation, the disclosed proxy protocol is used to carry context from the proxy to the SPN, and this context informs the SPN to provide the language localization service. In this example implementation, the SNAT rule for language localization is applied to map a client IP address to a source IP address, also referred to herein as the Alias IP address, as shown at the SPN instances 614, and then as shown at the Cloud NAT Gateway instances 616 and 618, respectively, the client traffic is processed such that the Alias IP address is SNATed to the desired geography-based IP address for SNATing the egress traffic as performed on the source IP address from the Alias IP ranges. As also shown in FIG. 6, an external load balancer (ELB) 606 is provided for workload balancing the TCP connections incoming into the SASE compute environment to the multiple different Proxy instances 608.

In an example implementation, each of a plurality of SPNs in the cluster of SPNs for the region of the SASE cloud network is configured with distinct NAT rules for each supported language, in which each of the distinct NAT rules for each supported language is associated with a geography-based tag or geography-based attributes.

In an example implementation, the traffic is egressed from the SASE cloud network using a cloud NAT gateway to its original destination using the fixed public IP address based on the NAT rule to facilitate the language localization for Transmission Control Protocol (TCP) connections associated with the user app session, and wherein each cloud NAT gateway in a cluster of cloud NAT gateways for a compute region of the SASE cloud network is associated with a distinct public IP address to use as an egress IP address for source NAT (SNAT) of a predetermined region language.

In an example implementation a binding between the SPN and a cloud NAT gateway is determined at least in part by a geotag (e.g., ISO 3166 2-letter country code (EN, FR, etc.)) or a set of attributes (e.g., Country name, State/Province, City, latitude and longitude tuple, currency, etc.). In some cases, a default public IP address can also be configured on a cloud NAT gateway for the app user traffic that does not require language localization or for which an associated geolocation for the user app traffic does not match a configured geotag (e.g., the SPN can be configured to provide language localization for French, German, and English language; and when the ClientIP lookup does not result in a geotag of either France, Germany, or UK/US, a default geotag of either the compute region geo (e.g., DE) or a configurable parameter (e.g., EN) can be used for the NAT rule match). In addition, the geotag can be combined with a hash computed over, for example, <Client IP, Destination IP> to provide a client persistence service, such as similarly described above with respect to FIGS. 1-5, in conjunction with the above-described language localization service, such as similarly described above with respect to FIG. 6 and further described below with respect to FIG. 7.

In an example implementation, a Proxy Protocol or GENEVE TLVs are used to dynamically propagate a geotag and/or other attributes for the user app session. For example, the ClientIP, which is the user's public source IP, can be used to look up in an IP-to-geo database to determine the geotag. In another example, the traffic ingress port on the Proxy can be used to look up a port-to-geo database to determine the geotag. The decision to determine the geotag can be a static configuration parameter, or it can be dynamic per app access. It can also be extended to include traffic identified based on an application identification (app ID), user ID, source IP, etc. (e.g., only URLs categorized as news or travel get language localization service). Language localization context containing the geotag information of the client and/or other attributes can then be propagated using a Proxy Protocol or GENEVE TLVs from the downstream nodes to the upstream SPNs. Nodes such as tunnel termination endpoints (e.g., PA-RN), full proxy termination endpoints (e.g., PA-EP), etc. can dynamically determine if the app or user traffic requires language localization and propagates that information to the SPNs. PA-EP nodes can determine a requirement for language localization based on app ID, user ID, source IP, etc. The configuration path propagates the Categories or FQDNs of the apps that require language localization, via a URL category list or an External Dynamic List (EDL), such as similarly described above with respect to FIG. 1.

In an example implementation, the selection of language localization via the NAT rule can be implemented such that in addition to the public IP address (EdgeIP), there are predetermined alias IP ranges reserved for those countries as well. The cookie (e.g., connected-gw-ip in the NAT rule) can be extended to support both client persistence and language support simultaneously (e.g., as <persistence+geotag>).

For the NAT rules, consider for an example, if a given EP supports two types of persistence, and three languages in one compute region, then a total of 6 (2*3) NAT rules are needed, such as illustrated below.

| | |
|---|---|
| i. | <persistence 1> - <lang 1>, source NATed to alias range 1 for language 1 |
| ii. | <persistence 2> - <lang 1>, source NATed to alias range 2 for language 1 |
| iii. | <persistence 1> - <lang 2>, source NATed to alias range 3 for language 2 |
| iv. | <persistence 2> - <lang 2>, source NATed to alias range 4 for language 2 |
| v. | <persistence 1> - <lang 3>, source NATed to alias range 5 for language 3 |
| vi. | <persistence 2> - <lang 3>, source NATed to alias range 6 for language 3 |

In an example implementation, support for roaming SASE EP users is also provided. Roaming EP users may use a foreign ClientIP and thus do not have the ability to indicate preference for a particular public IP address for a given language region (e.g., EdgeIP). The foreign ClientIP based geotag will either be blocked by source IP access control lists (ACLs) or provide undesired language localization. The EP node can expose a new listener port with static binding per geo region. User app session traffic received on this port can thereby get the desired language localization based on the statically bounded geotag rather than that derived from the lookup using the ClientIP (e.g., to facilitate support for a source IP-based access control list (ACL filters)). As an example, users may desire to access Indian government web portals that implement source IP-based ACL filtering. When these users travel to Singapore for business and want to access the same web portals, their access will be denied due to the source IP being a Singaporean geotag (e.g., such a set of users can modify their Proxy Auto-Configuration (PAC) file to connect to PA-EP proxy on the port with the static geotag of India), and support for users' desired language can thereby be provided (e.g., users in Singapore will not have the ability to read Indian websites in Indian regional languages as the source IP is a Singaporean geotag, such a set of users can modify their PAC file to connect to EP proxy on the port with the static geotag of India). FIG. 8 illustrates an example configuration for port-based binding, the corresponding PAC files, and the associated NAT rules on the security processing node (SPN) instances with the alias IP addresses from the alias IP ranges configured on a cloud NAT gateway(s) in accordance with some embodiments.

In another example implementation, as similarly described above with respect to FIG. 1, the Proxy instance can be in the same VM as the SPN instance (e.g., either in a VM, or in a physical server, or in a construct such as a Kubernetes pod where the EP and the SPN are two containers). In this example implementation, the shared language localization is provided via an inter process communication (e.g., both the Proxy instance and the SPN instance can be part of the same process and communicate using shared memory or messages and these can carry the request for the ClientIP persistence).

Example process embodiments include the disclosed techniques for providing language localization for traffic egressing from a distributed SASE infrastructure will be further described below.

Figure 7:
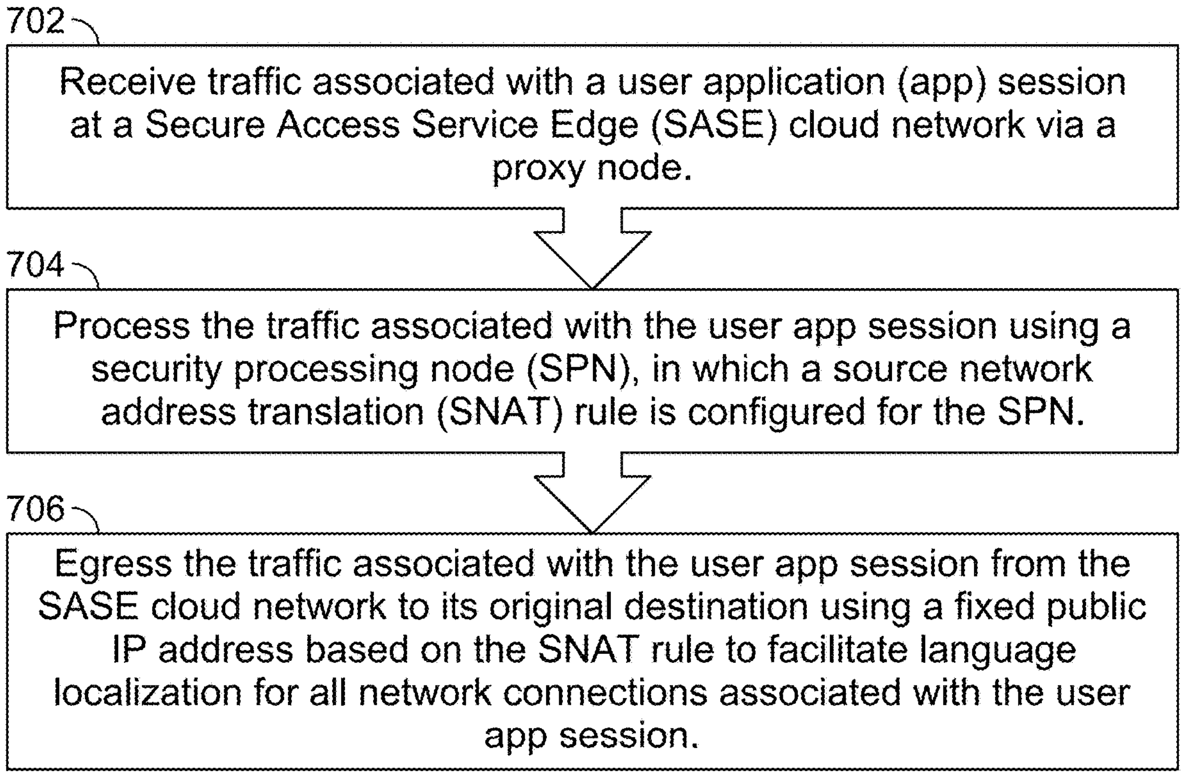
FIG. 7 is a flow diagram of a process for providing language localization for traffic egressing from a distributed SASE infrastructure in accordance with some embodiments.

Example Process Embodiments for Language Localization for Traffic Egressing from a Distributed SASE Infrastructure FIG. 7 is a flow diagram of a process for providing language localization for traffic egressing from a distributed SASE infrastructure in accordance with some embodiments. In some embodiments, a process as shown in FIG. 7 is performed by the SASE solution and techniques as similarly described above including the embodiments described above with respect to FIGS. 1 and 2. In one embodiment, the process shown in FIG. 7 is performed, at least in part, by SPN entities/clusters as described above with respect to FIG. 1.

The process begins at 702. At 702, traffic associated with a user application (app) session is received at a Secure Access Service Edge (SASE) cloud network via a proxy node (e.g., an Explicit Proxy (EP) instance, such as similarly described above with respect to FIG. 1).

At 704, the traffic associated with the user app session is processed using a security processing node (SPN), in which a source network address translation (SNAT) rule is configured for the SPN. For example, a given compute region of the SASE cloud environment can include a cluster of SPNs that are each associated with a distinct geography-based public IP address for client egress and by applying the above-described language localization protocol for SNATing the Alias IP ranges to the geography-based public IP address (e.g., such that egress traffic from French users are assigned a France-based public IP address for their egress traffic from the distributed SASE infrastructure, and egress traffic from German users are assigned a Germany-based public IP address for their egress traffic from the distributed SASE infrastructure, etc., to facilitate the desired language localization for user app traffic), such as similarly described above with respect to FIG. 6.

At 706, the traffic associated with the user app session is egressed from the SASE cloud network to its original destination using a fixed public IP address based on the SNAT rule to facilitate language localization for all network connections associated with the user app session.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system, comprising:

a processor configured to:

receive traffic associated with a user application (app) session at a Secure Access Service Edge (SASE) cloud network via a proxy node;

process the traffic associated with the user app session using a security processing node (SPN), wherein a network address translation (NAT) rule is configured for the SPN, and wherein a binding between the SPN and a cloud NAT gateway is determined at least in part by a consistent hashing algorithm and a type of client IP persistence to use including the following: (1) client IP address and destination IP address; and/or (2) client IP address, and wherein the consistent hashing algorithm reduces disruption to an alias IP selection for multiple network connections at a time of the NAT rule update for a scale out of cloud NAT gateway instances in a cloud NAT gateway cluster for a region of the SASE cloud network; and egress the traffic associated with the user app session from the SASE cloud network to its original destination using a fixed public Internet Protocol (IP) address based on the NAT rule to facilitate client IP persistence for all network connections associated with the user app session; and a memory coupled to the processor and configured to provide the processor with instructions.

2. The system recited in claim 1, wherein the SPN is an instance in a cluster of SPNs for a compute region of the SASE cloud network.

3. The system recited in claim 1, wherein the SPN is an instance in a cluster of SPNs for a compute region of the SASE cloud network, and wherein each of a plurality of SPNs in the cluster of SPNs for the region of the SASE cloud network is configured with the same NAT rule.

4. The system recited in claim 1, wherein the traffic is egressed from the SASE cloud network using a cloud NAT gateway to its original destination using the fixed public IP address based on the NAT rule to facilitate client IP persistence for the all network connections associated with the user app session including one or more Transmission Control Protocol (TCP) connections associated with the user app session.

5. The system recited in claim 1, wherein the traffic is egressed from the SASE cloud network using a cloud NAT gateway to its original destination using the fixed public IP address based on the NAT rule to facilitate client IP persistence for the all network connections associated with the user app session including one or more Transmission Control Protocol (TCP) connections associated with the user app session, and wherein each cloud NAT gateway in a cluster of cloud NAT gateways for a region of the SASE cloud network is associated with a public IP address to use as an egress IP address for source NAT (SNAT).

6. The system recited in claim 1, wherein the SPN includes a firewall as a service (FWaaS).

7. The system recited in claim 1, wherein the SPN includes a firewall as a service (FWaaS) that is configured with a security policy associated with a tenant of a SASE service.

8. The system recited in claim 1, wherein the SPN includes a firewall as a service (FWaaS) that is configured with a security policy that is based on contextual information associated with the user app session.

9. The system recited in claim 1, wherein the SPN includes a firewall as a service (FWaaS) that is configured to perform Uniform Resource Link (URL) filtering for the traffic associated with the user app session.

10. The system recited in claim 1, wherein the SPN includes a firewall as a service (FWaaS) that is configured to perform application Denial of Service (DoS) detection for the traffic associated with the user app session.

11. The system recited in claim 1, wherein the SPN includes a firewall as a service (FWaaS) that is configured to perform application Denial of Service (DoS) prevention for the traffic associated with the user app session.

12. The system recited in claim 1, wherein the processor is further configured to:

determine a security policy to apply at the SPN to the user app session based on contextual information associated with the user app session; and egress the traffic associated with the user app session from the SASE cloud network to its original destination if allowed by the security policy, and block or drop the traffic associated with the user app session from the SASE cloud network if not allowed by the security policy.

13. A method, comprising:

receiving traffic associated with a user application (app) session at a Secure Access Service Edge (SASE) cloud network via a proxy node;

processing the traffic associated with the user app session using a security processing node (SPN), wherein a network address translation (NAT) rule is configured for the SPN, and wherein a binding between the SPN and a cloud NAT gateway is determined at least in part by a consistent hashing algorithm and a type of client IP persistence to use including the following: (1) client IP address and destination IP address; and/or (2) client IP address, and wherein the consistent hashing algorithm reduces disruption to an alias IP selection for multiple network connections at a time of the NAT rule update for a scale out of cloud NAT gateway instances in a cloud NAT gateway cluster for a region of the SASE cloud network; and egressing the traffic associated with the user app session from the SASE cloud network to its original destination using a fixed public Internet Protocol (IP) address based on the NAT rule to facilitate client IP persistence for all network connections associated with the user app session.

14. The method of claim 13, wherein the SPN is an instance in a cluster of SPNs for a compute region of the SASE cloud network, and wherein each of a plurality of SPNs in the cluster of SPNs for the region of the SASE cloud network is configured with the same NAT rule.

15. The method of claim 13, wherein the traffic is egressed from the SASE cloud network using a cloud NAT gateway to its original destination using the fixed public IP address based on the NAT rule to facilitate client IP persistence for the all network connections associated with the user app session including one or more Transmission Control Protocol (TCP) connections associated with the user app session, and wherein each cloud NAT gateway in a cluster of cloud NAT gateways for a region of the SASE cloud network is associated with a public IP address to use as an egress IP address for source NAT (SNAT).

16. The method of claim 13, wherein the SPN includes a firewall as a service (FWaaS).

17. A computer program product, the computer program product being embodied in a tangible computer readable storage medium and comprising computer instructions for:

receiving traffic associated with a user application (app) session at a Secure Access Service Edge (SASE) cloud network via a proxy node;

processing the traffic associated with the user app session using a security processing node (SPN), wherein a network address translation (NAT) rule is configured for the SPN, and wherein a binding between the SPN and a cloud NAT gateway is determined at least in part by a consistent hashing algorithm and a type of client IP persistence to use including the following: (1) client IP address and destination IP address; and/or (2) client IP address, and wherein the consistent hashing algorithm reduces disruption to an alias IP selection for multiple network connections at a time of the NAT rule update for a scale out of cloud NAT gateway instances in a cloud NAT gateway cluster for a region of the SASE cloud network; and egressing the traffic associated with the user app session from the SASE cloud network to its original destination using a fixed public Internet Protocol (IP) address based on the NAT rule to facilitate client IP persistence for all network connections associated with the user app session.

18. The method of claim 13, wherein the SPN includes a firewall as a service (FWaaS) that is configured with a security policy associated with a tenant of a SASE service.

19. The method of claim 13, wherein the SPN includes a firewall as a service (FWaaS) that is configured with a security policy that is based on contextual information associated with the user app session.

20. The method of claim 13, further comprising:

determining a security policy to apply at the SPN to the user app session based on contextual information associated with the user app session; and egressing the traffic associated with the user app session from the SASE cloud network to its original destination if allowed by the security policy, and block or drop the traffic associated with the user app session from the SASE cloud network if not allowed by the security policy.

* * * * *